Sept. 5, 1967  J. E. SKUDERNA  3,339,838
TRIANGLE CALCULATOR
Filed Feb. 10, 1966
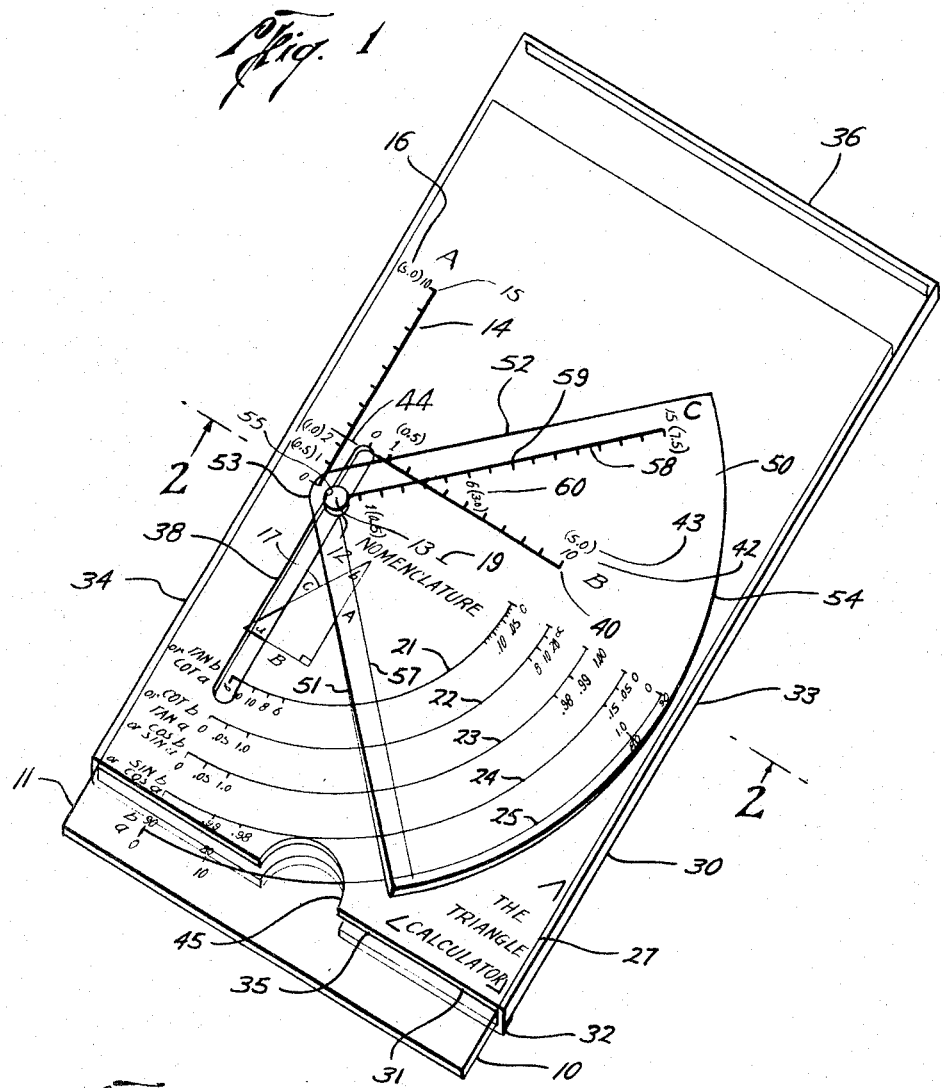
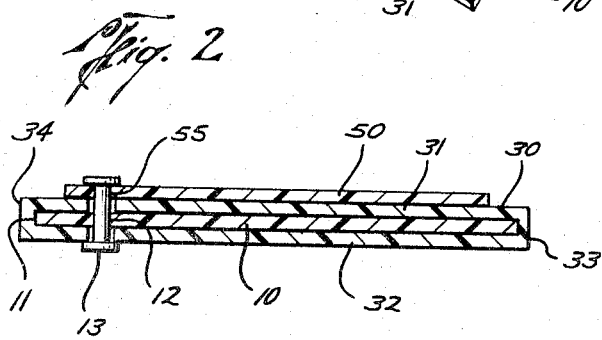
John E. Skuderna
INVENTOR.
BY Carl B. Fox, Jr.
ATTORNEY United States Patent Office 3,339,838
Patented Sept. 5, 1967

3,339,838
TRIANGLE CALCULATOR
John E. Skuderna, 871 S. Estes, Denver, Colo. 80226
Filed Feb. 10, 1966, Ser. No. 536,498
4 Claims. (Cl. 235—61)

ABSTRACT OF THE DISCLOSURE

The disclosure is of apparatus for use in solving right triangles, i.e. for determining unknown angles and/or sides of right triangles when certain of the angles and/or sides are known, and for determining the trigonometric functions of the angles of right triangles. A single setting of the apparatus provides readings of all of the unknown angles, sides and trigonometric functions of a right triangle, so that multiple settings are not required.

---

While devices for some of the above purposes are known, none of such devices perform all of these purposes, and none of such devices has the simplicity of operation and use inherent in devices provided according to this invention.

Therefore, the principal object of this invention is to provide apparatuses or devices of the type described which are simple and efficient in operation and use, and which give dependable results.

Briefly, devices provided according to this invention include a base web or plate having on its face a triangle side scale and arcuate scales for the acute angles of a right triangle and their trigonometric functions. The base plate includes a pivot located at the centers of the circles of the arcuate scales, and the triangle side scale extends from this pivot.

A transparent web or plate is disposed over the base plate and is movable therealong in the direction of the triangle side scale appearing on the base plate. A second triangle side scale is carried by the transparent plate and extends thereon at right angles to the triangle side scale of the base plate. A pivotally movable second transparent web or plate is superposed over the transparent plate above-mentioned, and has thereon, at right angles one to the other, an index line and an intersecting right triangle hypotenuse (side) scale, these intersecting at and extending from the aforesaid pivot. This second transparent plate, therefore, is pivotally movable about this same pivot.

An outstanding feature of the apparatus afforded by the invention is its simplicity of operation, which will be made clear by the detailed description of the apparatus. In addition, the apparatus is of flat form and is small, so that it may be readily carried. Also, the device may be made to be very accurate so that reference to tables for determination of trigonometric functions of right triangles may be avoided except where extreme accuracy is required, the angle and side determinations made using the apparatus being equally accurate.

Other objects and advantages of the invention will become apparent from the following detailed description of a preferred embodiment of apparatus according to the invention, reference being made to the accompanying drawings, of which:

FIG. 1 is a perspective view of a preferred embodiment of apparatus; and,

FIG. 2 is a cross sectional view taken at line 2—2 of FIG. 1.

Referring now to the drawings in detail, there is shown a web or plate 10, hereinafter sometimes referred to as the base web or base plate, shown to be of rectangular flat form, although this plate or web may take other forms consistent with the invention as described herein.

Spaced inwardly from one of the longer sides 11 of plate 10, and about halfway between its shorter ends, there is a pivot hole 12 through which is disposed a pin or bolt 13 serving as a pivot. A straight line scale 14, indicated on the base web by the letter A, extends parallely along the surface of web 10 parallel to edge 11 thereof. Scale 14 is subdivided by lateral lines, as on a ruler, indicating length longitudinally of web 10 from pivot 13. Two sets of scale dimensions referred to by reference numerals 15 and 16 are disposed over the length of line scale 14.

On the face of plate 10, there is disposed the configuration 17 of a right triangle having its sides indicated by A, B, and C. The acute angles of the triangle are indicated by $a$, and $b$, with the right angle being indicated by the conventional symbol of a square disposed in the right angle. The triangle 17 is further indicated by the word "Nomenclature," which indicates that side A of triangle 17 has a correlation with scale A, previously described.

A line 19 is disposed across the face of plate 10 through pivot 13 and perpendicularly to the two longer sides of the plate. Commencing at line 19, and extending downwardly and arcuately to the left about the pivot center 13, there are disposed on the surface of plate 10 five arcuate scales (90° arc, each) referred to by reference numerals 21–25. At one end, these arcuate scales are indicated by the words "TAN $b$ or COT $a$," "COT $b$ or TAN $a$," "COS $b$ or SIN $a$," "SIN $b$ or COS $a$," and "$ba$," respectively. Each of these scales is subdivided by transverse lines in the normal scale designation manner and numerals are placed therealong to indicate the values of the tangential functions and of the acute angles of right triangles. The angles, of course, are to be read from scale 25 at the end of which is the angle indication "$ab$," corresponding to the angles of the triangle.

At the lower right-hand corner of the surface of plate 10 there is the label "THE TRIANGLE CALCULATOR" indicated by reference numeral 27.

A sleeve 30 formed of flat upper web 31 and flat lower web 32, at least web 31 being transparent, is formed with these webs connected at their longer sides at 33, 34. Each of the webs 31, 32 is approximately the same size as web 10, and web 10 is insertable into the sleeve 30 from either of its open ends 35, 36. The pin 13 extends through a slot 38 disposed longitudinally of web 31 of sleeve 30, the sleeve 30 therefore being movable longitudinally of web 10 with the pivot pin 13 moving along the length of slot 38. The uppermost position of the pin in slot 38 corresponds to the position wherein the web ends are aligned. A transverse line scale 40, indicated by triangle side designation B, is subdivided and marked along its length by numerical length markings 42 and 43. These designations correspond to the designations 15, 16 of scale A on web 10 and indicate lengths from pivot 13. The slot 38 extends at right angles to scale 40, and scale 40 is perpendicular to each of the sides 33, 34 of web 31 of sleeve 30. A semicircular cutout 45 is provided at the lower ends of webs 31, 32 to enable grasping with the fingers of the end of web 10.

A transparent web or plate 50 has two of its edges 51, 52 at right angles one to the other connected at rounded corner 53. The other side 54 of web 50 is arcuately formed, the center of the arc being at pivot hole 55, and pin 13 extends through this pivot hole so that the three webs or plates 10, 30, and 50 are connected together with plate 10 within sleeve 30 and plate 50 superimposed above the surface of web 31 of sleeve 30. On the surface of plate 50 there is disposed an index line 57 which is parallel with side 51 of plate 50. Parallel to side 52 of plate 50, and extending from the center of pivot 13, there is a line scale 58 which is indicated by the letter C appearing on the face of plate 50. Line scale 58 is subdivided by transverse length markings indicating lengths from pivot 13 and along its length there are disposed the length scales 59 and 60. These designations are spaced the same as designations 15 and 16 on the A scale and 42 and 43 on the B scale. Scale 58, indicating the length of side C of triangle 17, is shown one and one-half times the length of each of the scales A and B, referred to by reference numerals 14 and 40.

It will be apparent that index line 57 of plate 50 can be pivotally moved corresponding to any position of the five arcuate scales 21–25, and that the pivot hole 55, while enabling the pivotal movement of plate 50, retains the same pivot position of index line 57 with respect to the arcuate scales at all times.

Regardless of the position of sleeve 30 with respect to plate 10, the line scale B, referred to by reference numeral 40, is always at right angles with line scale A, referred to by reference numeral 14, and the right angle of the triangle is included therebetween.

For solution of a right triangle, it is necessary that certain information be known. Either the length of two sides of the triangle, or the length of one side and one of the acute angles, must be known. With this information of a right triangle known, the apparatus herein described may be used to completely solve the triangle, including the determination of the trigonometric functions of the angles of the triangle.

If the lengths of two sides of a triangle are known, the device may be used to solve the triangle in the following manner:

Say, for example, that the two non-hypotenuse sides A and B of a triangle are known, then sleeve 30 is moved with respect to plate 10 so that the index 44 of line scale 40 intersects line scale 14 (A) at the length of scale 14 corresponding to the length of side A of the triangle. By adjustment of the decimal point of the side A dimension the position for the length of side A of the triangle may be determined on the scale. It will be noted that line 40 extends to the left, as shown by index line 44 in the drawings, of the pivot pin 13, and this extending portion of line scale 40 is placed above line scale 14 at the point representing the length from the pivot of side A of the triangle to be solved. Pin 13 slideably moves in slot 38 during movement of sleeve 30 with respect to plate 10. Next, plate 50 is pivoted so that line scale 58 representing side C, or the hypotenuse, of the triangle to be solved crosses, or intersects, line scale B at the length subdivision thereof representing the length of known side B of the right triangle. With the device in this condition, the length of side C, the hypotenuse, of the right triangle may be read from line scale 58. The index line 57 is then in a position crossing all of the five arcuate scales 21–25, and the angles a, b may be read on scale 25. All of the trigonometric functions of the angles a, b may be read from scales 21–24. In addition, the trigonometric functions for the right angle may be read by using the scales indicated by a and taking the reading at the left end of the arcuate scales 21–24, or, using the scales indicated by b and taking the reading at the right end of the arcuate scales 21–24. Thus, the triangle is completely solved and all of the unknown elements thereof are now determined, and in addition, all of the trigonometric functions of the angles of the right triangle are determined.

If sides A and C, for example, are known, then the triangle may be solved by setting line scale 58 at the proper length for the hypotenuse C at its crossing of line scale 40, and then reading the length of side B of the triangle from scale 40. The trigonometric features are determined as has already been described.

If one angle, not the right angle, and one of the sides of the triangle to be solved are known, the procedure is substantially the same, except that the positioning of plate 50 is determined by the crossing of index line 57 on scale 25 to match the known angle a or b of the triangle. The remainder of the solution for the sides, angles, and trigonometric functions will now be apparent, these values simply being read from the proper line scales of the device.

The accuracy of the apparatus may be very good, with determination of the values to three decimal places being easily accomplished when the device is made in a precision form. The device may easily be carried on the person, so that it will be available for use at any time. It has been found that considerable time and energy are saved through use of the device, and the results are sufficiently accurate for practically any types of scientific and engineering calculations. The only times when the device may not prove to be useful are when the accuracy required is such as to exceed the accuracy achieved through use of the device. But by adjustment of the size and structure of the apparatus for precision work, a very substantial degree of precision and accuracy may be readily achieved.

While a preferred form of the apparatus has been shown and described, many modifications thereof may be made by persons skilled in the art without departing from the spirit of the invention, and it is intended to protect by Letters Patent all forms of the invention falling within the scope of the following claims.

I claim:

1. Apparatus for solving right triangles, comprising first plate means having pivot means extending from its surface, second plate means movably connected parallely to said first plate means, means for guiding said second plate means in movements back and forth in one direction along said first plate means, third plate means engaging said pivot means and pivotally disposed parallely to said first and second plate means, said first plate means having scale means for indicating lengths from said pivot in said one direction and scale means for indicating the magnitudes of the acute angles of a right triangle and their trigonometric functions over an angle of at least 90° about said pivot, said second plate means having scale means perpendicular to said first scale means for indicating lengths from said pivot perpendicular to said one direction, said third plate means having index line means through said pivot and having scale means for indicating lengths from said pivot perpendicular to said index line means, said third plate scale means intersecting said second plate scale means when said third plate index line means intersects said first plate scale means for indicating the magnitudes of the acute angles of a right triangle and their trigonometric functions, said other scale means indicating the respective lengths of the sides of the right triangle.

2. Apparatus according to claim 1, said first and second plate means being of rectilinear form, one of said first and second plate means comprising the upper web of a sleeve means having upper and lower webs connected along two opposite edges thereof extending in said one direction, the other of said first and second plate means being disposed within said sleeve and movable therein between said connected edges in said one direction as described, said third plate means being transparent and being disposed flushly against said one of said first and second plate means.

3. Apparatus according to claim 2, said line scales being adapted for accurate reading to three figures, said other of said first and second plate means fitting snugly within said sleeve means while movable in said one direction therein, whereby relative movements other than in said one direction between said first and second plate means are eliminated.

4. Device for solving right triangles, comprising first web means having a pivot means therethrough and having on its surface a first line scale means extending thereon in one direction from said pivot means for indicating thereon the length of one non-hypotenuse side of a right triangle and having on said surface plural radially spaced arcuate line scale means (arcuate portions of circles centered at said pivot means) for indication of right triangle angles (other than the right angle of the right triangle) and all of the trigonometric functions of said right triangle angles, said arcuate line scale means extending from ends thereof on a straight line through the pivotal center of said pivot means perpendicular to said first line scale means to ends thereof on a straight line through the pivotal center of said pivot means parallel to said first line scale means, one of said arcuate line scale means being adapted for indication along its length of the non-right angles of right triangles, the others of said line scale means being adapted for indication along their lengths of the trigonometric functions of said non-right angles of right triangles, second web means disposed flushly parallel to said first web means and movable to and fro along said first web means in the direction of said first line scale means, means for guiding said movement of said second web means in the direction of said first line scale means, said second web means having thereon straight second line scale means perpendicular to said first line scale means for indicating thereon the length of the other non-hypotenuse side of the right triangle, means for retaining said second web means so that said second line scale means thereon is maintained perpendicular to said first line scale means during said to and fro movement of said second web means along said first web means, third transparent web means flushly overlying said other web means having said pivot means engaged through an opening therethrough and pivotally movable over the surface of said other web means about said pivot, said third web means having on its surface an index line means extending through the center of said pivot and third line scale means extending from the center of said pivot perpendicularly of said index line means and disposed to intersect said second line scale means when said index line means is in a position intersecting said arcuate line scale means, whereby the sizes of the angles (other than the right angle) of a right triangle are crossed on said one of said arcuate line scales and the trignometric functions of said angles are crosssed on the others of said arcuate line scales by said index line of said third web when said first line scale is crossed by said second line scale at a length thereof from said pivot corresponding to the length of one of the non-hypotenuse sides of the right triangle and when said second line scale of said second web is crossed at a length thereof from a line through said pivot parallel to said first line scale corresponding to the length of the other non-hypotenuse side of the right triangle by said third index line of said third web at a length of said third line scale from said pivot corresponding in length to the length of the hypotenuse of the right triangle, and vice versa, whereby when sufficient of the elements of the right triangle are known to set the apparatus webs as described all of the other elements of the right triangle may be read from said line scales and thereby determined.

References Cited
UNITED STATES PATENTS

| | | | |
|---|---|---|---|
| 2,436,352 | 2/1948 | Downs | 235—61 |
| 2,736,491 | 2/1956 | Potter | 235—61 |
| 2,999,633 | 9/1961 | Pini | 235—61 |
| 3,014,646 | 12/1961 | Gabriel | 235—61 |

STEPHEN J. TOMSKY, *Primary Examiner.*